(12) United States Patent
Kim

(10) Patent No.: US 11,335,933 B2
(45) Date of Patent: May 17, 2022

(54) DEVICE AND METHOD FOR MANUFACTURING MEMBRANE-ELECTRODE ASSEMBLY OF FUEL CELL

(71) Applicants: Hyundai Motor Company, Seoul (KR); Kia Motors Corporation, Seoul (KR)

(72) Inventor: Ki Hong Kim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 16/857,595

(22) Filed: Apr. 24, 2020

(65) Prior Publication Data

US 2020/0251762 A1    Aug. 6, 2020

Related U.S. Application Data

(62) Division of application No. 15/697,635, filed on Sep. 7, 2017, now Pat. No. 10,673,086.

(30) Foreign Application Priority Data

May 10, 2017    (KR) .................. 10-2017-0057946

(51) Int. Cl.
*H01M 8/1086*    (2016.01)
*H01M 8/1004*    (2016.01)
(Continued)

(52) U.S. Cl.
CPC ....... *H01M 8/1093* (2013.01); *B32B 37/0053* (2013.01); *B32B 38/145* (2013.01);
(Continued)

(58) Field of Classification Search
CPC . H01M 8/1093; H01M 4/881; B32B 37/0053; B32B 37/10
See application file for complete search history.

(56) References Cited

U.S. PATENT DOCUMENTS 7,833,673 B2    11/2010   Morimoto et al.
8,197,632 B2 *   6/2012   Suzuki ................ H01M 8/0289
                                                          156/297
(Continued)

FOREIGN PATENT DOCUMENTS

| JP | 2008004486 A | 1/2008 |
| KR | 20140026404 A | 3/2014 |
| KR | 20170040018 A | 4/2017 |

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A manufacturing device of a membrane-electrode assembly for a fuel cell is provided. The manufacturing device includes an electrolyte membrane feeding unit forming a first and second ionomer bases impregnated at both surfaces of a reinforcing layer and unwinding an electrolyte membrane wound in a roll type supplied in a predetermined transporting path. A first patterning unit is disposed at a rear side of the electrolyte membrane feeding unit and patterns a first ionomer protrusion pattern layer on the first ionomer base and a second patterning unit is disposed at the rear side of the first patterning unit and patterns a second ionomer protrusion pattern layer on the second ionomer base. A transfer unit is disposed at the rear side of the second patterning unit and couples a catalyst electrode layer on the first and second ionomer protrusion pattern layers by a roll laminating method.

6 Claims, 16 Drawing Sheets

(51) Int. Cl.
*H01M 4/88* (2006.01)
*H01M 8/0297* (2016.01)
*B32B 37/00* (2006.01)
*B32B 38/00* (2006.01)

(52) U.S. Cl.
CPC ............ *B32B 38/164* (2013.01); *H01M 4/88* (2013.01); *H01M 4/881* (2013.01); *H01M 4/8828* (2013.01); *H01M 8/0297* (2013.01); *H01M 8/1004* (2013.01); *B32B 2457/18* (2013.01)

(56) References Cited

U.S. PATENT DOCUMENTS

| | | |
|---|---|---|
| 2003/0143452 A1 | 7/2003 | Ito et al. |
| 2004/0001986 A1 | 1/2004 | Yazici et al. |
| 2007/0009776 A1 | 1/2007 | Nodono |
| 2007/0026291 A1 | 2/2007 | Kim et al. |
| 2008/0003485 A1 | 1/2008 | Krishnan et al. |
| 2008/0083499 A1 | 4/2008 | Nodono |
| 2008/0086871 A1 | 4/2008 | Rohland |
| 2010/0112405 A1 | 5/2010 | Peters et al. |
| 2010/0129730 A1 | 5/2010 | Suzuki |
| 2012/0064430 A1 | 3/2012 | Nakanishi et al. |
| 2012/0171596 A1 | 7/2012 | Hilliard |
| 2013/0017416 A1 | 1/2013 | Goeting et al. |
| 2013/0202986 A1 | 8/2013 | Moose et al. |
| 2014/0011116 A1 | 1/2014 | Ozawa |
| 2016/0087284 A1 | 3/2016 | Takagi |
| 2016/0276689 A1 | 9/2016 | Onomichi et al. |
| 2017/0033384 A1 | 2/2017 | Cho |
| 2017/0179497 A1* | 6/2017 | Zou ............... H01M 8/109 |
| 2017/0271699 A1 | 9/2017 | Kokoi et al. |
| 2018/0166709 A1 | 6/2018 | Lee et al. |
| 2018/0250922 A1 | 9/2018 | Aimu |
| 2018/0354690 A1 | 12/2018 | Collaud et al. |
| 2018/0366745 A1 | 12/2018 | Kim et al. |
| 2019/0044170 A1 | 2/2019 | Hubner |
| 2019/0288318 A1 | 9/2019 | Edmundson et al. |

* cited by examiner

FIG. 6A
31 or 51
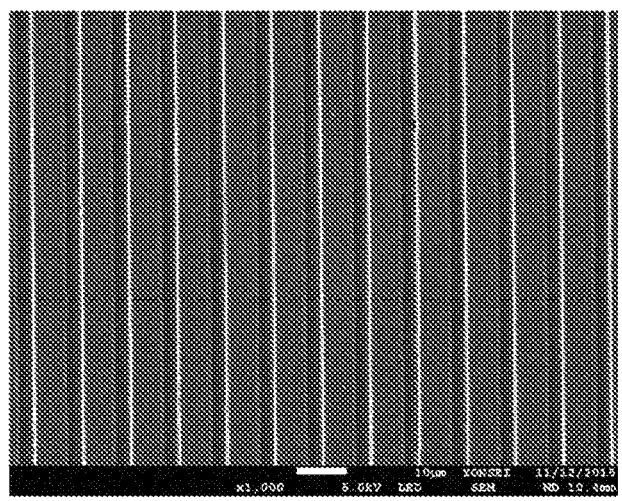
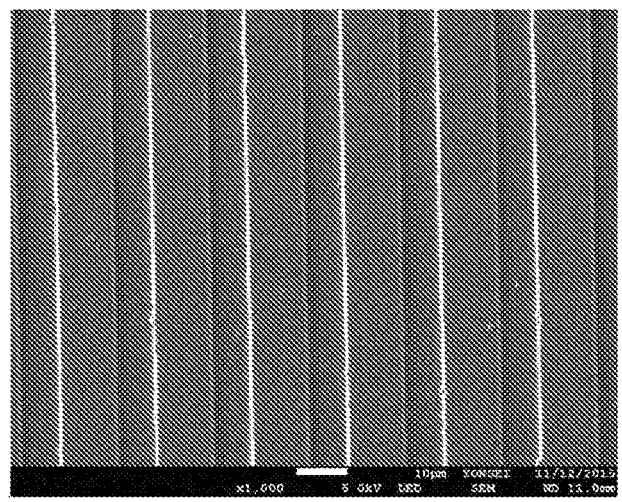
FIG. 6B 31 or 51

31 or 51

31 or 51

31 or 51

31 or 51

DEVICE AND METHOD FOR MANUFACTURING MEMBRANE-ELECTRODE ASSEMBLY OF FUEL CELL

CROSS-REFERENCE TO RELATED APPLICATION

This application is a Divisional Application of U.S. patent application Ser. No. 15/697,635 filed on Sep. 7, 2017 which claims under 35 U.S.C. § 119 (a) the benefit of Korean Patent Application No. 10-2017-0057946 filed on May 10, 2017, the entire content of which are incorporated herein by reference.

BACKGROUND

(a) Field of the Disclosure

The present disclosure relates to a fuel cell stack component manufacturing system, and more particularly, to a manufacturing device and a manufacturing method of a membrane-electrode assembly (MEA) for a fuel cell for manufacturing the membrane-electrode assembly of the fuel cell.

(b) Description of the Related Art

Generally, a fuel cell produces electricity via an electrochemical reaction between hydrogen and oxygen. The fuel cell is capable of continuously generating electricity by receiving a chemical reactant from an external source without requiring a separate charging process. The fuel cell is configured by disposing separators (e.g., separating plates or bipolar plates) at both sides of a membrane-electrode assembly (MEA). A plurality of fuel cells are continuously arranged to form a fuel cell stack. For example, a membrane-electrode assembly is a core component of the fuel cell as a three-layer structure, via an electrolytic membrane in which hydrogen ions transfer. An anode catalyst electrode layer is formed on one surface of the electrolytic membrane and a cathode catalyst electrode layer is formed on the other surface of the electrolytic membrane.

A method of manufacturing the three-layer structure membrane-electrode assembly includes a direct coating method or a decal method. Conversely, a roll-to-roll process unrolls the electrolyte membrane rolled in a roll form and forms a catalyst electrode layer on both surface of the electrolyte membrane. Since the electrolyte membrane has a reduced physical property, a method directly coating a catalyst slurry to the electrolyte membrane is not applied. Accordingly, in the roll-to-roll process according to a conventional art, since the direct coating of the catalyst electrode layer for the electrolyte membrane is not possible, a decal method that transfers the catalyst electrode layer to the electrolyte membrane after separately coating the catalyst electrode layer to a heteromorphic film is applied.

In the decal method, the heteromorphic film of a roll type coated with the catalyst electrode layer and the electrolyte membrane of the roll type are released and are passed through a joining roll (e.g., hot rolling roll) of high temperature to be laminated e.g., thermal-compressed) and the heteromorphic film is removed, thereby manufacturing the membrane-electrode assembly. In other words, in the manufacturing process of the membrane-electrode assembly using the decal method, the heteromorphic film in which each catalyst electrode layer coated on both surfaces of the electrolyte membrane is laminated, the catalyst electrode layer is transferred to both surfaces of the electrolyte membrane to be bonded by a roll laminating method and the heteromorphic film is removed to manufacture the membrane-electrode assembly.

In particular, manufacturing the membrane-electrode assembly by the decal method using the roll laminating process, improves manufacturing speed and provides advantages in production with glass. Conversely, in the electrolyte membrane of the membrane-electrode assembly, an ionomer layer improves an ion conductivity, a chemical stability and an ion selectivity is formed on both surfaces of a reinforcing layer. However, in this membrane-electrode assembly, while a contraction and an expansion of the electrolyte membrane and the catalyst electrode layer are repeated using fuel cell, the electrolyte membrane and the electrode layer are easily detached due to a thermal expansion coefficient difference between the electrolyte membrane and the catalyst electrode layer combined to the ionomer layer of the electrolyte membrane.

Accordingly, in the conventional art, the completed membrane-electrode assembly is heat-treated in high temperature. However, the heat treatment is performed while the membrane-electrode assembly is exposed in high temperature during an extended duration since a heat transmission into the electrolyte membrane is not smooth. In other words, as the heat treatment is performed while the membrane-electrode assembly is exposed in high temperature during an extended duration, a damage of the catalyst electrode layer occurs, because of the duration required for the heat treatment and productivity of the membrane-electrode assembly deteriorates.

The above information disclosed in this section is merely for enhancement of understanding of the background of the disclosure and therefore it may contain information that does not form the prior art that is already known in this country to a person of ordinary skill in the art.

SUMMARY

The present disclosure provides a manufacturing device and a manufacturing method of a membrane-electrode assembly capable of separately patterning a protrusion pattern on an ionomer layer of an electrolyte membrane and roll-laminating a catalyst electrode layer to both surface of the electrolyte membrane in the roll-to-roll continuous process.

A manufacturing device of a membrane-electrode assembly for a fuel cell according to an exemplary embodiment of the present disclosure may include an electrolyte membrane feeding unit that forms a first and second ionomer bases impregnated at both surfaces of a reinforcing layer and unwinding an electrolyte membrane wound in a roll type in a predetermined transporting path to be supplied, a first patterning unit disposed at a rear side of the electrolyte membrane feeding unit and configured to pattern a first ionomer protrusion pattern layer of a predetermined shape on the first ionomer base, a second patterning unit disposed at the rear side of the first patterning unit and configured to pattern a second ionomer protrusion pattern layer of a predetermined shape on the second ionomer base and a transfer unit disposed at the rear side of the second patterning unit and that couples a catalyst electrode layer on the first and second ionomer protrusion pattern layers by a roll laminating method.

The manufacturing device according to an exemplary embodiment of the present disclosure may further include a drying furnace disposed between the second patterning unit and the transfer unit on the transporting path and configured to dry the first and second ionomer protrusion pattern layers. In the manufacturing device of the membrane-electrode assembly for the fuel cell according to an exemplary embodiment of the present disclosure, the drying furnace may irradiate infrared rays to the first and second ionomer protrusion pattern layers of the electrolyte membrane transferring along the transporting path.

In an exemplary embodiment of the present disclosure, the first patterning unit may include an ionomer reservoir disposed to face the first ionomer base of the electrolyte membrane lower surface under the transporting path and configured to receive an ionomer solution, a pattern roll partially immersed in the ionomer solution, installed within the ionomer reservoir and configured to be rotated and forming an engrave pattern that corresponds to the first ionomer protrusion pattern layer on an external circumference surface, a blade disposed external to the ionomer reservoir and that removes the ionomer solution attached to an external circumference surface of the pattern roll and a pressurize roll disposed on the transporting path via the electrolyte membrane for the pattern roll and configured to pressurize the electrolyte membrane.

In an exemplary embodiment of the present disclosure, the second patterning unit may include a pattern screen disposed to face the second ionomer base of the electrolyte membrane upper surface on the transporting path and forming an aperture pattern that corresponds to the second ionomer protrusion pattern layer and a spray nozzle disposed on the pattern screen configured to apply the ionomer solution to the pattern screen. In addition, the spray nozzle may be configured to apply the ionomer solution to the pattern screen as an ultrasonic wave vibration. The first and second patterning units may respectively form the first and second ionomer protrusion pattern layers of a stripe shape on the first and second ionomer bases.

In the manufacturing device of the membrane-electrode assembly for the fuel cell according to an exemplary embodiment of the present disclosure, the first and second patterning units may respectively form the first and second ionomer protrusion pattern layers of a hexagon shape on the first and second ionomer bases. Additionally, the first and second patterning units may respectively form the first and second ionomer protrusion pattern layers of a square shape on the first and second ionomer bases. The first and second patterning units may respectively form the first and second ionomer protrusion pattern layers of a circular shape on the first and second ionomer bases.

In the manufacturing device of the membrane-electrode assembly for the fuel cell according to an exemplary embodiment of the present disclosure, the transfer unit may include a film unwinder configured to unwind a heteromorphic film of a roll shape coated with a catalyst electrode layer of an anode and a cathode to an upper and lower surface sides of the electrolyte membrane, upper and lower joining rolls respectively disposed on and under the transporting path of the electrolyte membrane and the heteromorphic film, configured to press and transfer the catalyst electrode layer on the upper surface and the lower surface of the electrolyte membrane. At least one of the upper and lower joining rolls may be configured to be rotatable and a film rewinder configured to rewind the heteromorphic film from the catalyst electrode layer may be removed.

A manufacturing method of a membrane-electrode assembly for a fuel cell according to an exemplary embodiment of the present disclosure may include unwinding the electrolyte membrane wound in a roll shape through the electrolyte membrane feeding unit to be supplied to a predetermined transporting path, patterning the first ionomer protrusion pattern layer of the predetermined shape on the first ionomer base of the electrolyte membrane lower surface through the first patterning unit, patterning the second ionomer protrusion pattern layer of the predetermined shape on the second ionomer base of the electrolyte membrane upper surface through the second patterning unit and respectively joining the catalyst electrode layer of the anode and the cathode on the first and second ionomer protrusion pattern layers through the transfer unit.

Additionally, in the manufacturing method of the membrane-electrode assembly for the fuel cell according to an exemplary embodiment of the present disclosure, patterning the second ionomer protrusion pattern layer may further include transferring the electrolyte membrane along the transporting path through a drying furnace and the first and second ionomer protrusion pattern layer may be dried. In particular, the infrared ray may be irradiated to the first and second ionomer protrusion pattern layers in the drying furnace.

Additionally, in the manufacturing method of the membrane-electrode assembly for the fuel cell according to an exemplary embodiment of the present disclosure, patterning the first ionomer protrusion pattern layer may further include rotating the pattern roll partially immersed in the ionomer solution within the ionomer reservoir. The ionomer solution coupled to the external circumference surface of the pattern roll may be removed through the blade. The ionomer solution filled in the engrave pattern of the pattern roll may be applied to the first ionomer base of the electrolyte membrane lower surface through the pressurize roll rotated while pressurizing the upper surface of the electrolyte membrane via the electrolyte membrane with the pattern roll. Additionally, patterning the second ionomer protrusion pattern layer may further include, applying the ionomer solution to the pattern screen of the electrolyte membrane upper surface side through a spray nozzle. The ionomer solution may be applied on the second ionomer base of the electrolyte membrane upper surface through an aperture pattern of the pattern screen.

Further, patterning the second ionomer protrusion pattern layer may include applying the ionomer solution through the spray nozzle to the pattern screen by an ultrasonic wave vibration. Additionally, joining the catalyst electrode layer of the anode and the cathode may include coating an upper and lower heteromorphic films with the catalyst electrode layer of the anode and the cathode and having the roll shape may be unwound through the film unwinder to be supplied to the upper and lower surface side of the electrolyte membrane. The electrolyte membrane and the upper and lower heteromorphic films may be passed between the upper and lower joining rolls to transfer the catalyst electrode layer of the upper and lower heteromorphic films on the upper surface and the lower surface of the electrolyte membrane. The method of, patterning the first and second ionomer protrusion pattern layers may include first and second ionomer protrusion pattern layers of one shape selected from a group consisting of a stripe shape, a hexagon shape, a square shape, and a circular shape that may be formed on the first and second ionomer bases.

As the exemplary embodiments of the present disclosure pattern first and second ionomer protrusion pattern layers on the first and second ionomer bases of the upper and lower surfaces of the electrolyte membrane, the membrane-electrode assembly improved with the interface bonding force of the electrolyte membrane and the catalyst electrode layer may be manufactured. Accordingly, in an exemplary embodiment of the present disclosure, the heat treatment duration of the membrane-electrode assembly may be reduced, productivity of the membrane-electrode assembly may be improved, damage of the catalyst electrode layer may be prevented and a durability of the catalyst electrode layer may be improved.

Further, effects that may be obtained or expected from exemplary embodiments of the present disclosure are directly or suggestively described in the following detailed description. That is, various effects expected from exemplary embodiments of the present disclosure will be described in the following detailed description.

BRIEF DESCRIPTION OF THE DRAWINGS

The drawings are provided for reference in describing exemplary embodiments of the present disclosure and the spirit of the present disclosure should not be construed only by the accompanying drawings.

FIG. 6A to FIG. 6G are exemplary photos showing a shape of a first and second ionomer protrusion pattern layers patterned by a first and second patterning units of a manufacturing device of a membrane-electrode assembly for a fuel cell according to an exemplary embodiment of the present disclosure;

DETAILED DESCRIPTION

Figure 1:
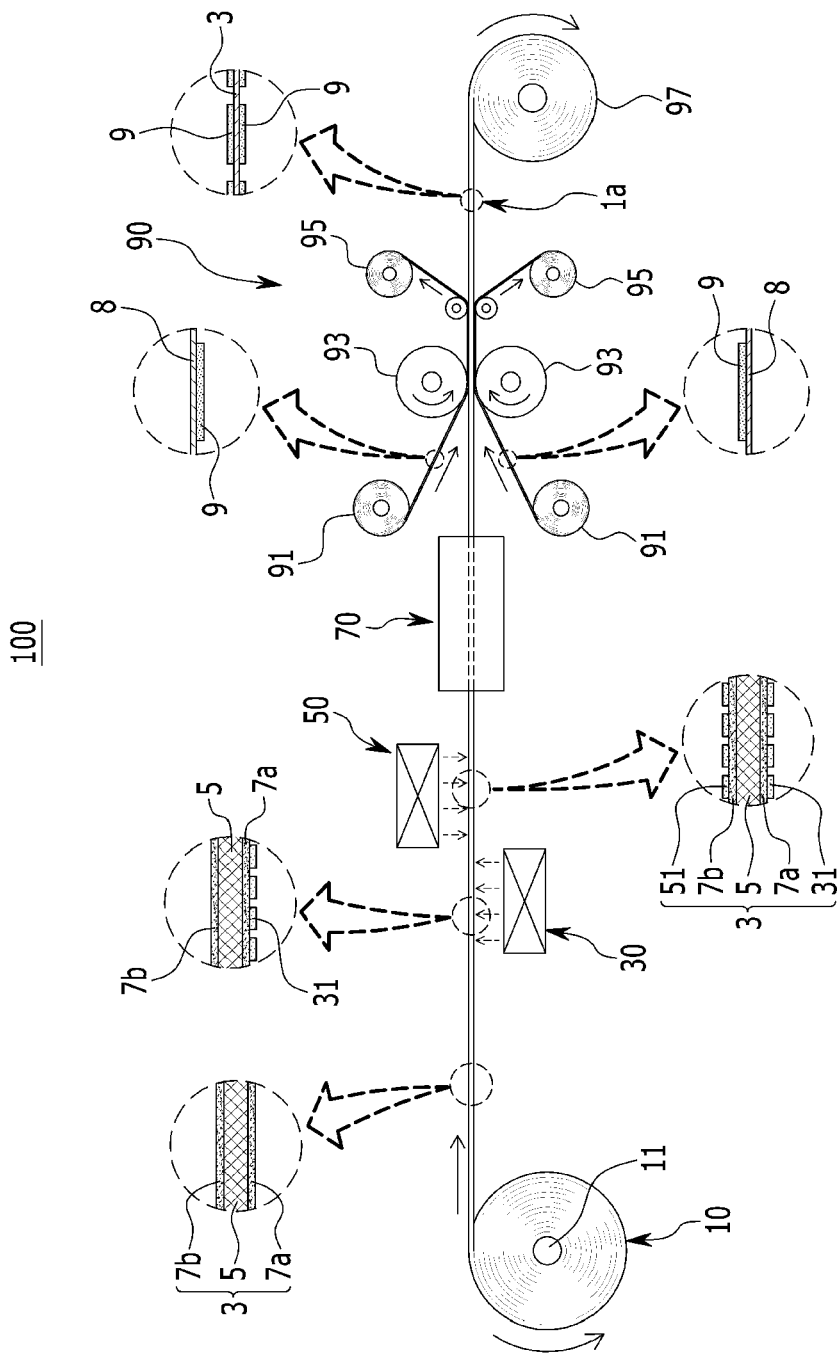
FIG. 1 is an exemplary view schematically showing a manufacturing device of a membrane-electrode assembly for a fuel cell according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. In order to clarify the present disclosure, parts that are not connected with the description will be omitted, and the same elements or equivalents are referred to with the same reference numerals throughout the specification. Also, the size and thickness of each element are arbitrarily shown in the drawings, but the present disclosure is not necessarily limited thereto, and in the drawings, the thickness of layers, films, panels, regions, etc., are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the singular forms "a", "an" and "the" are intended to include the plural forms as well, unless the context clearly indicates otherwise. In addition, unless explicitly described to the contrary, the word "comprise" and variations such as "comprises" or "comprising", will be understood to imply the inclusion of stated elements but not the exclusion of any other elements. Further, the terminologies described in the specification, such as "unit", "means", "part", "member, etc refer to units performing at least one function or operation. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary view schematically showing a manufacturing device of a membrane-electrode assembly for a fuel cell according to an exemplary embodiment of the present disclosure. Referring to FIG. 1, a manufacturing device 100 of a membrane-electrode assembly for a fuel cell may be applied to an automation system for automatically and consecutively manufacturing parts of unit fuel cells that form a fuel cell stack. In particular, the manufacturing device 100 of the membrane-electrode assembly for the fuel cell may manufacture a membrane-electrode assembly 1 (referring to FIG. 9) in which a catalyst electrode layer 9 is bonded to both surface of an electrolyte membrane 3, as a core part of the fuel cell.

For example, the electrolyte membrane 3 may include a structure having first and second ionomer bases 7a and 7b impregnated in both surfaces (e.g., an upper and lower surfaces in a drawing) of a reinforcing layer 5. Hereinafter, a ionomer base impregnated in the reinforcing layer 5 at the lower surface of the electrolyte membrane 3 is referred to as a first ionomer base 7a, and the ionomer base impregnated in the reinforcing layer 5 at the upper surface of the electrolyte membrane 3 is referred to as a second ionomer base 7b. In particular, the reinforcing layer 5 may be an e-PTFE well-known technology widely known in the industry and may form a number of pores. The first and second ionomer bases 7a and 7b may be formed by impregnating a hydrocarbon-based or fluorinated ionomer in an aperture of the reinforcing layer 5, and may be also named as an ionomer base layer.

The manufacturing device 100 of the membrane-electrode assembly for the fuel cell may automatically and continuously manufacture the membrane-electrode assembly 1 using the roll-to-roll method. The roll-to-roll method may include a method in which a part fabric wound in a roll shape may be unwound. The part fabric may be transported along a predetermined path through a plurality of transport rollers and a predetermined part element may be continuously formed to the corresponding part fabric. The manufacturing device 100 of the roll-to-roll method may loosen the fabric of the electrolyte membrane 3 wound in the roll shape, may loosen the fabric of a heteromorphic film 8 wound in the roll shape, and may bond the catalyst electrode layers 9 of an anode and a cathode coated to the fabric of the heteromorphic film 8 to both surfaces of the electrolyte membrane 3, thereby manufacturing the membrane-electrode assembly fabric 1a. Additionally, the manufacturing device 100 may include a process rolling the above-manufactured membrane-electrode assembly fabric 1a in the roll shape. Furthermore, although not shown in the drawing in an exemplary embodiment of the present disclosure, the membrane-electrode assembly fabric 1a wound in the roll shape may be loosened, the membrane-electrode assembly fabric 1a may be cut in a unit shape including the catalyst electrode layer 9 and the final membrane-electrode assembly 1 may be manufactured.

The manufacturing device 100 of the membrane-electrode assembly for the fuel cell according to an exemplary embodiment of the present disclosure may be formed from a structure capable of manufacturing the membrane-electrode assembly 1 improved with an interface bonding force of the electrolyte membrane 3 and the catalyst electrode layer 9. Furthermore, the manufacturing device 100 of the membrane-electrode assembly for the fuel cell may be capable of patterning a separate ionomer protrusion pattern to ionomer bases 7a and 7b of the electrolyte membrane 3 and bonding the catalyst electrode layer 9 on both surfaces of the electrolyte membrane 3 by a roll laminating method (referred to as a decal method in the industry) as a roll-to-roll continuous process.

In particular, the manufacturing device 100 of the membrane-electrode assembly for the fuel cell according to an exemplary embodiment of the present disclosure may integrally form the entire manufacturing process of the membrane-electrode assembly 1 from the patterning process of the ionomer protrusion pattern to the bonding process of the catalyst electrode layer as the roll-to-roll continuous method. For example, the manufacturing device 100 may include an electrolyte membrane feeding unit 10, a first patterning unit 30, a second patterning unit 50, a drying furnace 70, and a transfer unit 90. Each of the constituent elements may be configured in the main frame of a roll-to-roll feeding equipment. The main frame may be disposed in an upper and lower direction and may be configured by one frame or two or more partitioned frames to support each of the constituent elements.

The main frame may include various sub-elements to support the constituent elements of the manufacturing device 100 such as a bracket, a bar, a rod, a plate, a housing, a case, a block and the like. However, since the various sub-elements may be used to install the constituent elements of the manufacturing device 100, which will be described, to the main frame, the various sub-elements are generally referred to as the main frame, except for exceptional cases, in the exemplary embodiment of the present disclosure.

The electrolyte membrane feeding unit 10 may be used to loosen and supply the fabric electrolyte membrane 3 wound in the roll shape to a predetermined transporting path. The electrolyte membrane feeding unit 10 may be disposed in the main frame at a starting side (e.g., first side) of the transfer path 9 to be rotatable and may include a supply roller 11 configured to unwind the electrolyte membrane 1 wound in the roll form and supply the unwound electrolyte membrane to the transfer path 9. In an exemplary embodiment of the present invention, the first patterning unit 30 may pattern a first ionomer protrusion pattern layer 31 of a predetermined shape to a first ionomer base 7a of a lower surface of the electrolyte membrane 3 by a gravure coating method. The first patterning unit 30 may be disposed at the main frame in a rear side of the electrolyte membrane feeding unit 10.

Figure 2:
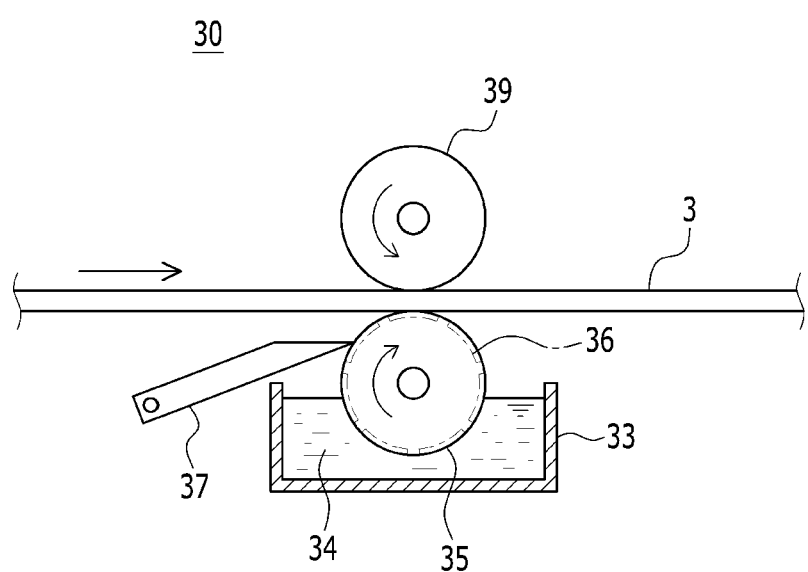
FIG. 2 is an exemplary view schematically showing a first patterning unit applied to a manufacturing device of a membrane-electrode assembly for a fuel cell according to an exemplary embodiment of the present disclosure.

FIG. 2 is an exemplary view schematically showing a first patterning unit applied to a manufacturing device of a membrane-electrode assembly for a fuel cell according to an exemplary embodiment of the present disclosure. Referring to FIG. 1 and FIG. 2, the first patterning unit 30 according to an exemplary embodiment of the present disclosure may include an ionomer reservoir 33, a pattern roll 35, a blade 37, and a pressurize roll 39. The ionomer reservoir 33 may receive a solution 34 (e.g., an ionomer solution) of an ionomer particle of a nano size faces a first ionomer base 7a of the lower surface of the electrolyte membrane 3 under the transporting path and may be coupled to the main frame. The ionomer reservoir 33 may be provided in a tank shape that may have an open upper end and a closed lower end. The pattern roll 35 may be partially immersed in the ionomer solution 34 within the ionomer reservoir 33, may be in contact with the first ionomer base 7a of the lower surface of the electrolyte membrane 3 and may be configured to rotate within the ionomer reservoir 33. An engrave pattern 36 that corresponds to the first ionomer protrusion pattern layer 31 of the above-described predetermined shape may be formed on an external circumference of the pattern roll 35.

Figure 3A:
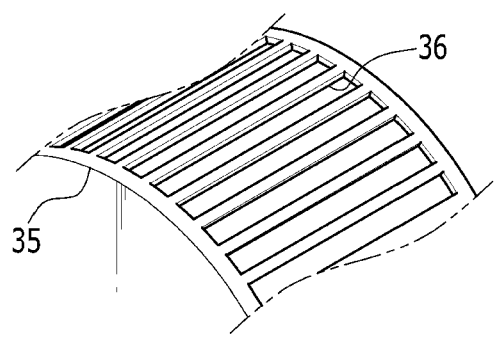
FIG. 3A to FIG. 3E are exemplary enlarged views of a pattern roll of a first patterning unit applied to a manufacturing device of a membrane-electrode assembly for a fuel cell according to an exemplary embodiment of the present disclosure.

A shape of the engrave pattern 36 of the pattern roll 35 is described in detail, and the above-described engrave pattern 36 may be formed in a stripe shape on the external circumference surface along a length direction of the pattern roll 35 as shown in FIG. 3A. The engrave pattern 36 may be formed to extend along the length direction of the pattern roll 35 and may be disposed parallel with a predetermined interval along the external circumference direction of the pattern roll 35. The external circumference surface of the pattern roll 35 may remain between the engrave patterns 36 of the stripe shape. In other words, the width of the engrave pattern 36 and the interval between the engrave patterns 36 may be adjusted.

Figure 3B:
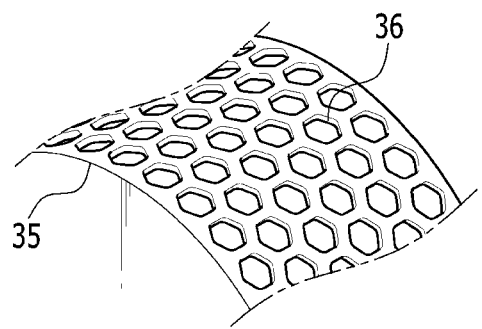
Figure 3C:
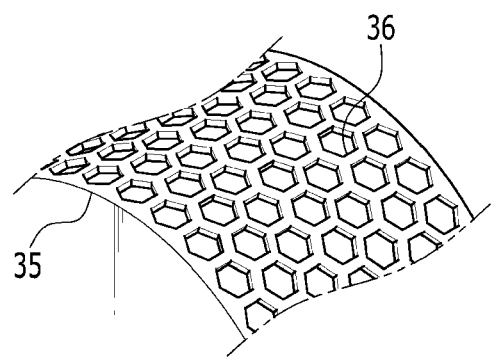
Figure 3D:
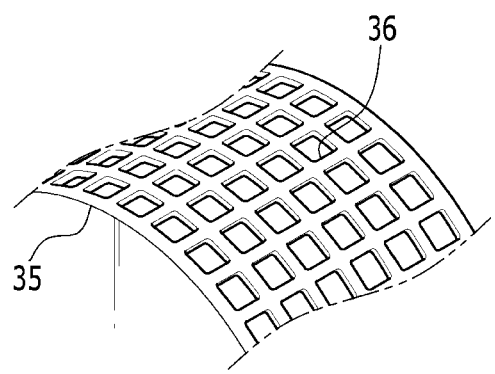

The engrave pattern 36 may have a hexagon shape of the external circumference surface of the pattern roll 35 as shown in FIG. 3B and FIG. 3C. As shown in FIG. 3B, the engrave pattern 36 does not have a directionality on the external circumference surface of the pattern roll 35 and may have a hexagon or circular shape. As shown in FIG. 3C, the engrave pattern 36 may have the directionality on the external circumference surface of the pattern roll 35 and may be have a regular hexagon shape. In other words, the external circumference surface of the pattern roll 35 between the engrave patterns 36 of the hexagon shape and the area of the engrave pattern 36 and the interval between the engrave patterns 36 may be adjusted. As shown in FIG. 3D, the engrave pattern 36 may have the directionality on the external circumference surface of the pattern roll 35, and may have a square shape (e.g., a regular square shape). For example, the external circumference surface of the pattern roll 35 may remain between the engrave patterns 36 of the square shape and the area of the engrave pattern 36 and the interval between the engrave patterns 36 may be adjusted.

Figure 3E:
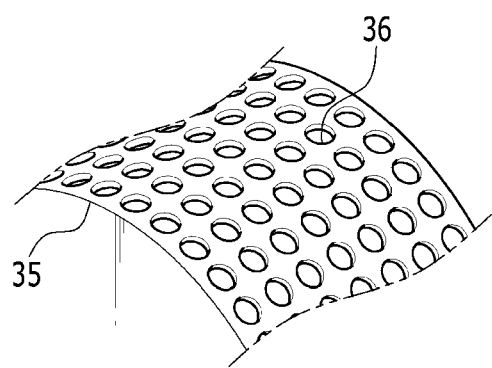

As shown in FIG. 3E, the engrave pattern 36 may have directionality on the external circumference surface of the pattern roll 35 and may be circular. The external circumference surface of the pattern roll 35 may remain between the engrave patterns 36 of the circular shape and the area of the engrave pattern 36 and the interval between the engrave patterns 36 may be variously adjusted. Alternatively, in an exemplary embodiment of the present disclosure, the shape of the engrave pattern 36 may be stripe shaped, the hexagon shape, the square shape or circular, however it is not limited thereto, and various shapes may be applied.

The blade 37 may be configured to extract the ionomer solution 34 attached to the external circumference surface of the pattern roll 35 and compress (e.g., squeeze) the external circumference surface of the pattern roll 35. In other words, when the pattern roll 35 is immersed in the ionomer solution 34 of the ionomer reservoir 33 and is rotated, the ionomer solution 34 may be filled to the engrave pattern 36 of the pattern roll 35. In particular, the blade 37 may be configured to remove the ionomer solution 34 attached to the external circumference surface of the pattern roll 35 and the ionomer solution 34 remains on the engrave pattern 36. The blade 37 may be disposed external to the ionomer reservoir 33 and may be configured to rotate the main frame. The blade 37 may be configured to pressurize the external circumference surface of the pattern roll 35 with an elastic force of a spring.

The pressurize roll 39 may be disposed on transporting path via the electrolyte membrane 3 with the pattern roll 35 and may be rotatable. The pressurize roll 39 may be configured to pressurize the electrolyte membrane 3 passing between the pressurize roll 39 and the pattern roll 35 to the side of the external circumference surface of the pattern roll 35 while being rotated in mutually opposite directions with the pattern roll 35. When the electrolyte membrane 3 passing between the pressurize roll 39 and the pattern roll 35 is pressurized through the pressurize roll 39, the ionomer solution 34 filled in the engrave pattern 36 of the pattern roll 35 may be transferred to the first ionomer base 7a of the lower surface of the electrolyte membrane 3 as the first ionomer protrusion pattern layer 31 of the predetermined shape corresponds to the engrave pattern 36.

Figure 4:
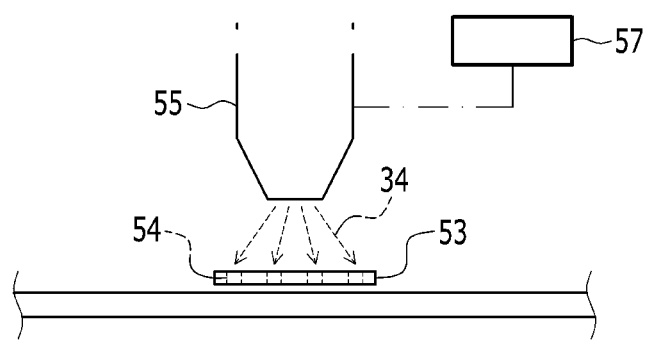
FIG. 4 is an exemplary view schematically showing a second patterning unit applied to a manufacturing device of a membrane-electrode assembly for a fuel cell according to an exemplary embodiment of the present disclosure.

FIG. 4 is an exemplary view schematically showing a second patterning unit applied to a manufacturing device of a membrane-electrode assembly for a fuel cell according to an exemplary embodiment of the present disclosure. Referring to FIG. 1 and FIG. 4, the second patterning unit 50 may be configured to pattern a second ionomer protrusion pattern layer 51 of a predetermined shape to the second ionomer base 7b of the upper surface of the electrolyte membrane 3. The second patterning unit 50 may be disposed on the main frame in the rear side of the first patterning unit 30. The second patterning unit 50 may include a pattern screen 53 and a spray nozzle 55. The pattern screen 53 as a patterning mask facing the second ionomer base 7b of the electrolyte membrane 3 upper surface on the transporting path with a predetermined fine interval may be coupled to the main frame. The pattern screen 53 may be formed with an aperture pattern 54 that corresponds to the second ionomer protrusion pattern layer 51 of the above-described predetermined shape.

Figure 5A:
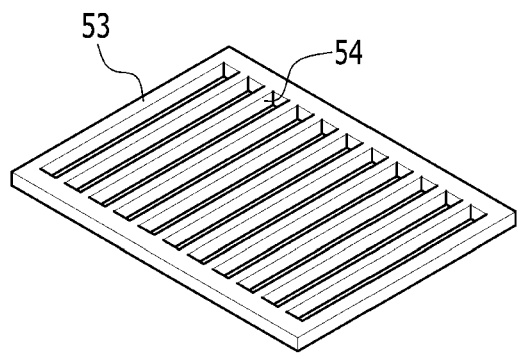
FIG. 5A to FIG. 5E are exemplary enlarged views of a pattern screen of a second patterning unit applied to a manufacturing device of a membrane-electrode assembly for a fuel cell according to an exemplary embodiment of the present disclosure.

The aperture pattern 54 shape of the pattern screen 53 is described in detail, as shown in FIG. 5A, the aperture pattern 54 may be formed in the stripe shape on the pattern screen 53 along the width direction of the electrolyte membrane 3. The aperture pattern 54 may be formed to extend along the width direction of the pattern screen 53 and may be disposed to be parallel to each other with a predetermined interval along the length direction of the pattern screen 53. The screen surface of the pattern screen 53 may remain between the aperture patterns 54 of the stripe shape, and the width of the aperture pattern 54. The interval between the aperture patterns 54 may be adjusted.

Figure 5B:
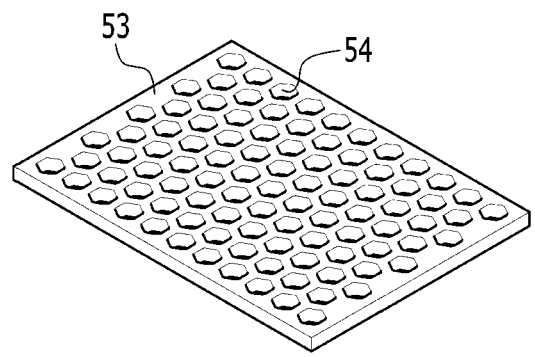
Figure 5C:
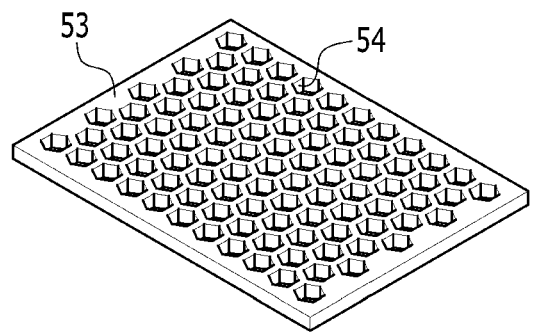

As shown in FIG. 5B and FIG. 5C, the aperture pattern 54 may have a hexagon shape on the pattern screen 53. For example, as shown in FIG. 5B, the aperture pattern 54 does not have the directionality on the pattern screen 53 and may have a hexagon shape similar to a circle. As shown in FIG. 5C, the aperture pattern 54 may have directionality on the pattern screen 53 and may be have a regular hexagon shape. The screen surface of the pattern screen 53 may remain between the aperture patterns 54 of the hexagon shape and the area of the aperture pattern 54. The interval between the aperture pattern 54 may be adjusted.

Figure 5D:
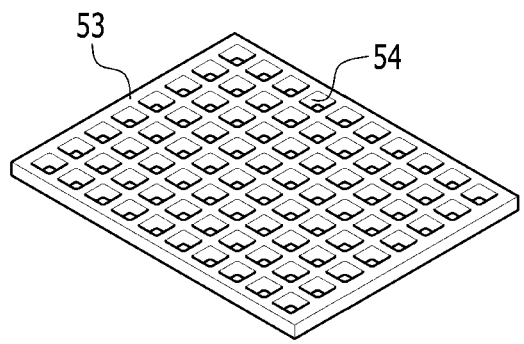
Figure 5E:
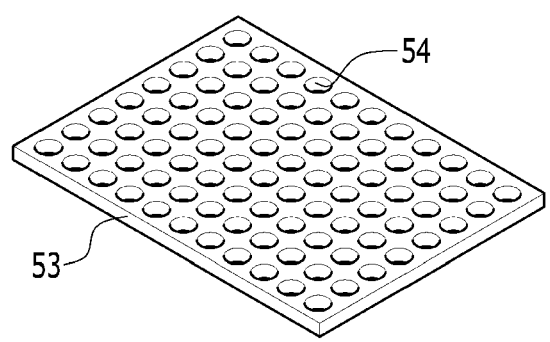

As shown in FIG. 5D, the aperture pattern 54 may have directionality on the pattern screen 53 and may be a square shape (e.g., the regular square shape). The screen surface of the pattern screen 53 may remain between the aperture patterns 54 of the hexagon shape and the area of the aperture pattern 54 and the interval between the aperture pattern 54 may be adjusted. As shown in FIG. 5E, the aperture pattern 54 has the directionality on the external circumference surface of the pattern screen 53 and may be circular. The screen surface of the pattern screen 53 may remain between the circular aperture patterns 54 and the area of the aperture pattern 54 and the interval between the aperture pattern 54 may be adjusted. Alternatively, in an exemplary embodiment of the present disclosure, the shape of the aperture pattern 54 may be stripe shaped, hexagon shaped, square shaped, or circular, however it is not limited thereto and various shapes may be applied.

The spray nozzle 55 may be configured to apply the ionomer solution 34 having the ionomer particle of the nano size to the pattern screen 53 and may be disposed on the main frame on the pattern screen 53. For example, the spray nozzle 55 may vibrate by ultrasonic wave provided from an ultrasonic wave vibration source 57 and may be configured to apply the ionomer solution 34 to the pattern screen 53. When the ultrasonic wave vibration is applied to the spray nozzle 55 and the ionomer solution 34 is applied to the pattern screen 53 by the spray nozzle 55, the ionomer solution 34 passes through the aperture pattern 54 of the pattern screen 53 and may be coated on the second ionomer base 7b of the electrolyte membrane 3 upper surface as the second ionomer protrusion pattern layer 51 of the predetermined shape that corresponds to the aperture pattern 54.

Figure 6C:
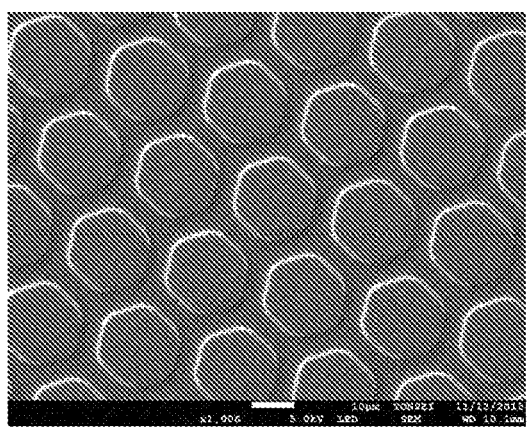
Figure 6D:
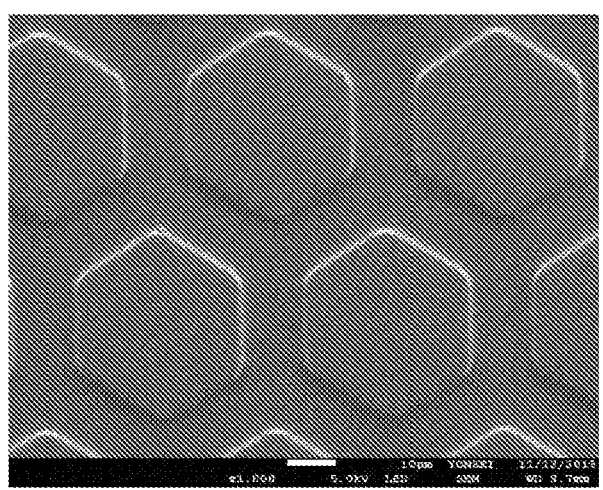
Figure 6E:
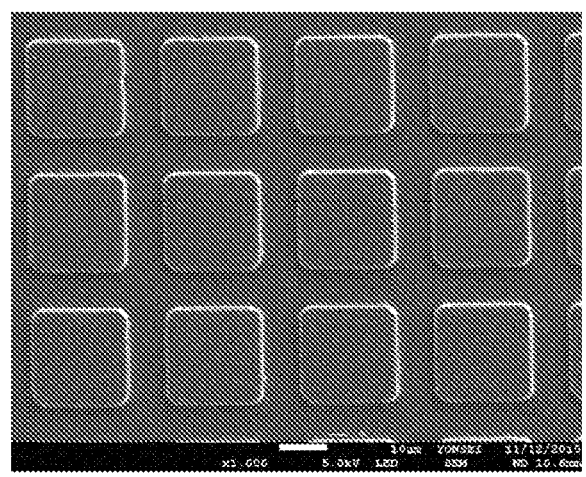
Figure 6F:
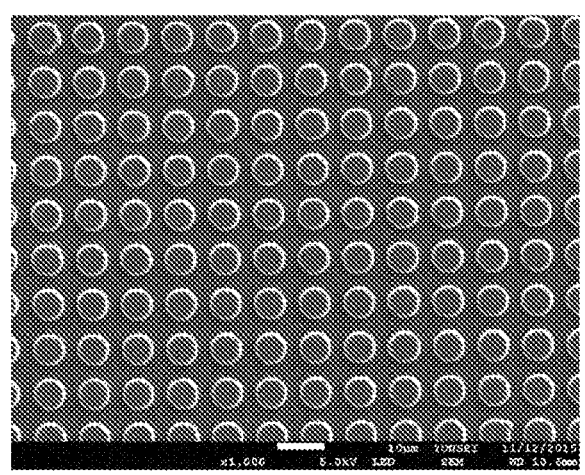
Figure 6G:
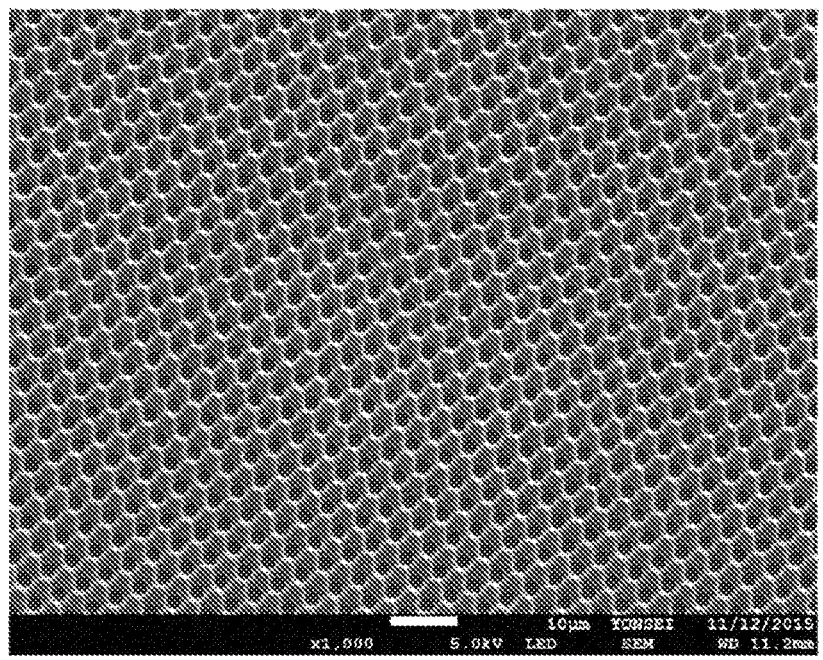

For example, as shown in FIGS. 6A and 6B, the first and second ionomer protrusion pattern layers 31 and 51 may be formed of land protrusions having a stripe shape on the first and second ionomer bases 7a and 7b of the electrolyte membrane 3 by the first and second patterning units 30 and 50. Additionally, the first and second ionomer protrusion pattern layers 31 and 51 may be formed of the land protrusions have a hexagon shape as shown in FIG. 6C and FIG. 6D, may be formed of the land protrusions having a square shape as shown in FIG. 6E and may be formed of the land protrusions having a circular shape as shown in FIG. 6F. Alternatively, the first and second ionomer protrusion pattern layers 31 and 51 may be formed of the land protrusions of various shapes, furthermore, as shown in FIG. 6G, they may be formed of a pattern of a lattice shape that a plurality of apertures are included in the first and second ionomer bases 7a and 7b.

Figure 7:
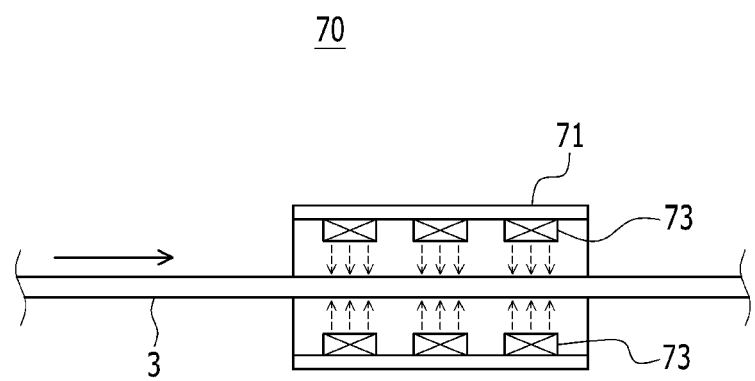
FIG. 7 is an exemplary view schematically showing a drying furnace applied to a manufacturing device of a membrane-electrode assembly for a fuel cell according to an exemplary embodiment of the present disclosure.

FIG. 7 an exemplary view schematically showing a drying furnace applied to a manufacturing device of a membrane-electrode assembly for a fuel cell according to an exemplary embodiment of the present disclosure. Referring to FIG. 1 and FIG. 7, the drying furnace 70 according to an exemplary embodiment of the present disclosure may be configured to dry the first and second ionomer protrusion pattern layers 31 and 51 respectively patterned on the first and second ionomer bases 7a and 7b of the electrolyte membrane 3. The drying furnace 70 may be disposed on the main frame at the rear side of the second patterning unit 50. In particular, the drying furnace 70 may be disposed on the transporting path of the electrolyte membrane 3 between the second patterning unit 50 and a later-described transfer unit 90. The drying furnace 70 may include a drying chamber 71 through which the electrolyte membrane 3 that the first and second ionomer protrusion pattern layers 31 and 51 are respectively patterned on the first and second ionomer bases 7a and 7b may pass along the transporting path. Furthermore, the drying furnace 70 may include an infrared radiator 73 configured to irradiate infrared rays to the first and second ionomer protrusion pattern layers 31 and 51 of both surfaces of the electrolyte membrane 3. The infrared radiator 73 may be disposed within the drying chamber 71.

For example, the infrared radiator 73 as a known infrared ray irradiation apparatus may irradiate infrared rays to the first and second ionomer protrusion pattern layers 31 and 51 of both surfaces of the electrolyte membrane 3 disposed via the electrolyte membrane 3 transporting along the transporting path within the drying chamber 71. Accordingly, the first and second ionomer protrusion pattern layers 31 and 51 may be dried by infrared rays. As described above, the reason for drying the first and second ionomer protrusion pattern layer 31 and 51 with the infrared ray in the drying furnace 70 may prevent deformation of the first and second ionomer protrusion pattern layers 31 and 51 by wind force when drying the first and second ionomer protrusion pattern layers 31 and 51 by a heat wind or a room temperature wind.

Conversely, as shown in FIG. 1, the transfer unit 90 according to an exemplary embodiment of the present disclosure may continuously join the catalyst electrode layer 9 to both surfaces (e.g., upper and lower surfaces) of the electrolyte membrane 3 transported along the transport path through drying 70. The transfer unit 90 may be configured to transfer the catalyst electrode layer 9 to the first and second ionomer bases 7a and 7b of both surfaces of the electrolyte membrane 3 and the first and second ionomer protrusion pattern layers 31 and 51 by a roll laminating method (e.g., a decal method) to be joined. The transfer unit 90 may be configured to loosen the fabric of the heteromorphic film 8 wound in the roll shape to the transporting path of the electrolyte membrane 3 and join the catalyst electrode layer 9 of the anode and the cathode coated on the fabric of the heteromorphic film 8 to both surfaces of the electrolyte membrane 3, respectively.

The transfer unit 90 may be coupled the main frame at the rear side of the drying furnace 70 and may include a film unwinder 91, upper and lower joining rolls 93, and a film rewinder 95. The film unwinder 91 may be disposed at the upper and lower sides of the transporting path of the electrolyte membrane 3 and may be configured to unwind and supply the heteromorphic film 8 of the roll shape on which the catalyst electrode layer 9 of the anode and the cathode are respectively coated to the upper and lower sides of the electrolyte membrane 3. For example, the film unwinder 91 may be configured to unwind the heteromorphic film 8 of the roll shape on which the catalyst electrode layer 9 of the anode and the cathode are respectively coated with a predetermined interval to be supplied to the upper and lower sides of the electrolyte membrane 3.

The upper/lower joining rolls 93 may be configured to press the anode and cathode catalyst electrode layer 9 of the heteromorphic film 8 positioned at the upper and lower sides of the electrolyte membrane 3 via the electrolyte membrane 3 and to respectively transfer the catalyst electrode layer 9 on the upper and lower surfaces of the electrolyte membrane 3 to be coupled together. The upper and lower joining rolls 93 may be configured to be rotated at the upper and lower sides of a traveling path of the electrolyte membrane 3 and the heteromorphic film 8 and at least one may be disposed to be capable of reciprocating in the vertical direction.

The film rewinder 95 may be configured to collect the heteromorphic film 8 removed from the catalyst electrode layer 9. The film rewinder 95 may be configured to wind the heteromorphic film 8 that is removed from the catalyst electrode layer 9 and may be disposed at the upper and lower sides of the traveling path of the electrolyte membrane 3 and the heteromorphic film 8. Furthermore, the transfer unit 90 may further includes a MEA fabric rewinder 97 rolling the membrane-electrode assembly fabric 1a that couples the catalyst electrode layer 9 to both surfaces of the electrolyte membrane 3 with the roll shape.

Figure 8:
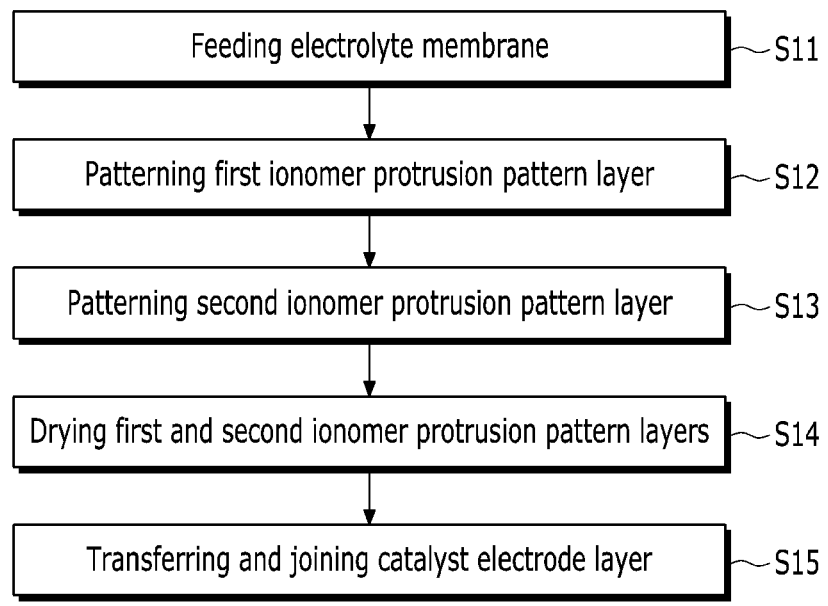
FIG. 8 is an exemplary flowchart to explain a manufacturing method of a membrane-electrode assembly for a fuel cell according to an exemplary embodiment of the present disclosure.

Further, a method manufacturing the membrane-electrode assembly for the fuel cell 1 using the manufacturing device 100 of the membrane-electrode assembly for the fuel cell according to an exemplary embodiment of the present disclosure will be described with reference to the above-described drawings and accompanying drawings. FIG. 8 is an exemplary flowchart of a manufacturing method of a membrane-electrode assembly for a fuel cell according to an exemplary embodiment of the present disclosure. Referring to the above-described drawings and FIG. 8, in an exemplary embodiment of the present disclosure, the fabric of the electrolyte membrane 3 wound in the roll shape may be released through the electrolyte membrane feeding unit 10. The electrolyte membrane 3 may be inserted into to the predetermined transporting path step S11. In this process, in an exemplary embodiment of the present disclosure, the first ionomer protrusion pattern layer 31 of the predetermined shape may be patterned to the first ionomer base 7a of the lower surface of the electrolyte membrane 3 transported along the transporting path through the first patterning unit 30 by a gravure coating method step S12.

The pattern roll 35 that is partially immersed in the ionomer solution 34 of the ionomer reservoir 33 may be configured to be rotated step S12. Thus, the ionomer solution 34 may be filled to the engrave pattern 36 of the pattern roll 35. In an exemplary embodiment of the present disclosure, the ionomer solution 34 attached to the external circumference surface of the pattern roll 35 may be removed through the blade 37 and the ionomer solution 34 may remain on the engrave pattern 36. For example, the electrolyte membrane 3 may pass between the pressurize roll 39 and the pattern roll 35 and in this case, the pressurize roll 39 may be configured to pressurize the electrolyte membrane 3 to the side of the external circumference surface of the pattern roll 35. As described above, as the electrolyte membrane 3 passing between the pressurize roll 39 and the pattern roll 35 is may be pressurized through the pressurize roll 39. In an exemplary embodiment of the present disclosure, the ionomer solution 34 filled to the engrave pattern 36 of the pattern roll 35 may be transferred to the first ionomer base 7a of the electrolyte membrane 3 lower surface. Accordingly, the first ionomer protrusion pattern layer 31 as the land protrusion may have any one shape among the predetermined shapes that corresponds to the engrave pattern 36 of the pattern roll 35, for example a stripe shape, hexagon shape, square shape, or circular shape may be formed on the first ionomer base 7a of the electrolyte membrane 3 lower surface.

Further, in an exemplary embodiment of the present disclosure, as described above, in the process patterning the first ionomer protrusion pattern layer 31 on the electrolyte membrane 3 lower surface, the second ionomer protrusion pattern layer 51 of the predetermined shape may be patterned on the second ionomer base 7b of the electrolyte membrane 3 upper surface through the second patterning unit 50 by the spray coating method step S13. An ultrasonic wave vibration may be applied to the spray nozzle 55 through the ultrasonic wave vibration source 57 and the ionomer solution 34 may be applied to the pattern screen 53 through the spray nozzle 55 step S13. Thus, the ionomer solution 34 passes through the aperture pattern 54 of the pattern screen 53 and may be coated on the second ionomer base 7b of the electrolyte membrane 3 upper surface. Accordingly, the second ionomer protrusion pattern layer 51 as the land protrusion may have any one shape among the predetermined shapes that corresponds to the aperture pattern 54 of the pattern screen 53, for example the stripe shape, the hexagon shape, the square shape, and the circular shape may be formed on the second ionomer base 7b of the electrolyte membrane 3 upper surface.

As described above, when the first and second ionomer protrusion pattern layers 31 and 51 are respectively patterned on the lower surface and the upper surface of the electrolyte membrane 3, the electrolyte membrane 3 may be transported along the transporting path and may enter the interior of the drying furnace 70. Accordingly, in the drying furnace 70, infrared rays may be irradiated to the first and second ionomer protrusion pattern layers 31 and 51 of the upper and lower surfaces of the electrolyte membrane 3 via the electrolyte membrane 3 that are transported along the transporting path through the infrared radiator 73, to the first and second ionomer protrusion pattern layers 31 and 51 step S14.

In an exemplary embodiment of the present disclosure, when the first and second ionomer protrusion pattern layers 31 and 51 are dried by infrared rays, a physically external force is not applied to the first and second ionomer protrusion pattern layers 31 and 51 and the deformation of the first and second ionomer protrusion pattern layers 31 and 51 due to the external force of hot wind or room temperature wind may be prevented. Additionally, in an exemplary embodiment of the present disclosure, in the drying furnace 70, the electrolyte membrane 3 in which the first and second ionomer protrusion pattern layers 31 and 51 are dried may be transferred to the transfer unit 90 and the catalyst electrode layer 9 may be continuously joined to the upper and lower surfaces of the electrolyte membrane 3 through the transfer unit 90 step S15. The upper and lower heteromorphic films 8 of the roll shape respectively coated with the catalyst electrode layer 9 of the anode and the cathode may be unwound to the sides of the upper and lower surfaces of the electrolyte membrane 3 through the film unwinder 91 step S15.

The electrolyte membrane 3 and the upper and lower heteromorphic films 8 may enter between the upper and lower joining rolls 93. Accordingly, as the upper and lower joining rolls 93 apply a force (e.g., press) to upper and lower heteromorphic films 8 via the electrolyte membrane 3 therebetween, the catalyst electrode layer 9 of the upper and lower heteromorphic films may be respectively transferred to the upper surface and the lower surface of the electrolyte membrane 3 to be coupled together. In particular, the catalyst electrode layer 9 may be coupled to the first and second ionomer bases 7a and 7b and the first and second ionomer protrusion pattern layer 31 and 51 of the upper and lower surface of the electrolyte membrane 3 by the roll laminating method. For example, the heteromorphic film 8 from which the catalyst electrode layer 9 is removed may be recovered while rolling in film rewinder 95. The membrane-electrode assembly fabric 1a in which the catalyst electrode layer 9 is joined on the upper and lower surfaces of the electrolyte membrane 3 may be rolled to the MEA fabric rewinder 97 with the roll shape.

Figure 9:
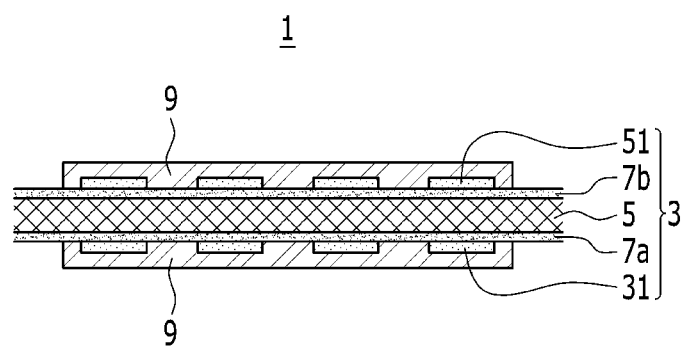
FIG. 9 is an exemplary cross-sectional diagram schematically showing a membrane-electrode assembly manufactured by a manufacturing device and a manufacturing method of a membrane-electrode assembly for a fuel cell according to an exemplary embodiment of the present disclosure.

Accordingly, in an exemplary embodiment of the present disclosure, when the membrane-electrode assembly fabric 1a wound in the roll shape is unwound and the membrane-electrode assembly fabric 1a is cut in the unit shape including the catalyst electrode layer 9, the membrane-electrode assembly 1 like FIG. 9 may be manufactured. The membrane-electrode assembly 1 manufactured through a series of processes as described above may form the structure having the first and second ionomer protrusion pattern layers 31 and 51 may be formed on the first and second ionomer bases 7a and 7b of the upper and lower surfaces of the electrolyte membrane 3.

The catalyst electrode layer 9 may be coupled to the first and second ionomer bases 7a and 7b and the first and second ionomer protrusion pattern layers 31 and 51. This membrane-electrode assembly 1 may increase the coupling area of the catalyst electrode layer 9 for the upper and lower surfaces of the electrolyte membrane 3 since the first and second ionomer protrusion pattern layers 31 and 51 may be formed on the first and second ionomer bases 7a and 7b of the upper and lower surfaces of the electrolyte membrane 3. Accordingly, in an exemplary embodiment of the present disclosure, the bonding force of the catalyst electrode layer 9 for the upper and lower surfaces of the electrolyte membrane 3 may be improved, thereby improving a performance and a durability of the membrane-electrode assembly 1.

According to the manufacturing device 100 and method of the membrane-electrode assembly for the present disclosure as described above, as the roll-to-roll continuous process, the first and second ionomer protrusion pattern layers 31 and 51 may be patterned to the first and second ionomer base 7a and 7b of the upper and lower surfaces of the electrolyte membrane 3 and the catalyst electrode layer 9 may be coupled to the upper and lower surfaces of the electrolyte membrane 3. In particular, in an exemplary embodiment of the present disclosure, the entire manufacturing process of the membrane-electrode assembly 1 from the patterning process of the first and second ionomer protrusion pattern layers 31 and 51 for the electrolyte membrane 3 to the transfer coupling process of the catalyst electrode layer 9 may be integrated into the continuous roll-to-roll method. When the first and second ionomer protrusion pattern layers 31 and 51 are patterned to the first and second ionomer bases 7a and 7b of the upper and lower surfaces of the electrolyte membrane 3, the membrane-electrode assembly 1 may be improved with the interface bonding force of the electrolyte membrane 3 and the catalyst electrode layer 9 may be manufactured. Accordingly, in an exemplary embodiment of the present disclosure, heat treatment time of the membrane-electrode assembly 1 as a following process may be reduced, productivity of the membrane-electrode assembly 1 may be improved, damage to the catalyst electrode layer 9 may be prevented and the durability of the catalyst electrode layer 9 may be improved.

An exemplary embodiment of the present disclosure is disclosed herein, but the present disclosure is not limited to the disclosed exemplary embodiments, and, on the contrary, is intended to cover various modifications and equivalent arrangements included within the appended claims and the detailed description and the accompanying drawing of the present disclosure.

DESCRIPTION OF SYMBOLS

1 ... membrane-electrode assembly
1a ... membrane-electrode assembly fabric
3 ... electrolyte membrane
5 ... reinforcing layer
7a ... first ionomer base
7b ... second ionomer base
8 ... heteromorphic film
9 ... catalyst electrode layer
10 ... electrolyte membrane feeding unit
11 ... supply roller
30 ... first patterning unit
31 ... first ionomer protrusion pattern layer
33 ... ionomer reservoir
34 ... ionomer solution
35 ... pattern roll
36 ... engrave pattern
37 ... blade
39 ... pressurize roll
50 ... second patterning unit
51 ... second ionomer protrusion pattern layer
53 ... pattern screen
54 ... aperture pattern
55 ... spray nozzle
57 ... ultrasonic wave vibration source
70 ... drying furnace
71 ... drying chamber
73 ... infrared radiator
90 ... transfer unit
91 ... film unwinder
93 ... joining rolls
95 ... film rewinder
97 ... fabric rewinder

What is claimed is:

1. A manufacturing method of a membrane-electrode assembly for a fuel cell using a manufacturing device of the membrane-electrode assembly for the fuel cell including an electrolyte membrane feeding unit, first and second patterning units, and a transfer unit, comprising:
unwinding an electrolyte membrane wound in a roll shape through the electrolyte membrane feeding unit to be supplied to a predetermined transporting path;
patterning a first ionomer protrusion pattern layer of a predetermined shape on a first ionomer base of an electrolyte membrane lower surface through the first patterning unit;
patterning a second ionomer protrusion pattern layer of a predetermined shape on a second ionomer base of an electrolyte membrane upper surface through the second patterning unit; and coupling, respectively, a catalyst electrode layer of an anode on the first ionomer protrusion pattern layer and a catalyst layer of a cathode on the second ionomer protrusion pattern layer through the transfer unit,
wherein the patterning the second ionomer protrusion pattern layer includes:
rotating the pattern roll partially immersed in an ionomer solution within an ionomer reservoir;
removing the ionomer solution attached to an external circumference surface of the pattern roll through a blade; and
coating the ionomer solution filled in an engrave pattern of the pattern roll on the first ionomer base of the electrolyte membrane lower surface through a pressurize roll rotated while pressurizing the upper surface of the electrolyte membrane via the electrolyte membrane with the pattern roll.

2. The manufacturing method of claim 1, wherein patterning the second ionomer protrusion pattern layer includes
transferring the electrolyte membrane along the predetermined transporting path through a drying furnace and the first and second ionomer protrusion pattern layer is dried; and
irradiating the infrared ray to the first and second ionomer protrusion pattern layers in the drying furnace.

3. The manufacturing method of claim 1, wherein patterning the second ionomer protrusion pattern layer includes
applying the ionomer solution to the pattern screen of the electrolyte membrane upper surface side through a spray nozzle, and
coating the ionomer solution on the second ionomer base of the electrolyte membrane upper surface through an aperture pattern of a pattern screen.

4. The manufacturing method of claim 1, wherein patterning the second ionomer protrusion pattern layer includes applying the ionomer solution using the spray nozzle to the pattern screen by an ultrasonic wave vibration.

5. The manufacturing method of claim 1, wherein the coupling, respectively, the catalyst electrode layer of the anode on the first ionomer protrusion pattern layer and the catalyst layer of the cathode on the second ionomer protrusion pattern layer through the transfer unit includes:
coating, respectively, an upper and lower heteromorphic films with the catalyst electrode layer of the anode and the catalyst electrode layer of the cathode and unwinding the roll shape through a film unwinder to be supplied to the electrolyte membrane upper surface and the electrolyte membrane lower surface; and
passing the electrolyte membrane and the upper and lower heteromorphic films between upper and lower joining rolls to transfer, respectively, the catalyst electrode layer of the upper heteromorphic film on the electrolyte membrane upper surface and the catalyst electrode layer of the lower heteromorphic film on the electrolyte membrane lower surface.

6. The manufacturing method of claim 1, wherein:
the first and second ionomer protrusion pattern layers includes of one shape selected from the group consisting of: a stripe shape, a hexagon shape, a square shape, and a circular shape formed on the first and second ionomer bases.

* * * * *